United States Patent
Piekarski

(10) Patent No.: US 6,799,423 B2
(45) Date of Patent: Oct. 5, 2004

(54) ADJUSTABLE EXHAUST SYSTEM FOR INTERNAL COMBUSTION ENGINE

(76) Inventor: David L. Piekarski, 32381 County Rd. 4, Ashby, MN (US) 56309

( * ) Notice: Subject to any disclaimer, the term of this patent is extended or adjusted under 35 U.S.C. 154(b) by 0 days.

(21) Appl. No.: 10/206,133

(22) Filed: Jul. 26, 2002

(65) Prior Publication Data

US 2003/0136120 A1 Jul. 24, 2003

Related U.S. Application Data

(60) Provisional application No. 60/319,097, filed on Jan. 24, 2002.

(51) Int. Cl.[7] ............................................... F02B 27/02
(52) U.S. Cl. .............................. 60/313; 60/312; 60/314; 60/322; 60/323; 60/324; 181/227; 181/228; 181/215; 181/240
(58) Field of Search .......................... 60/274, 312, 313, 60/314, 305, 322, 323, 324; 181/209, 215, 216, 227, 228, 240, 249, 255

(56) References Cited

U.S. PATENT DOCUMENTS

| | | | | |
|---|---|---|---|---|
| 4,690,245 A | * | 9/1987 | Gregorich et al. | ......... 181/272 |
| 5,248,859 A | * | 9/1993 | Borla | ......... 181/238 |
| 5,579,638 A | | 12/1996 | Archer | |
| 5,625,173 A | * | 4/1997 | Woods | ......... 181/227 |
| 5,729,973 A | | 3/1998 | Zander et al. | |
| 5,902,970 A | * | 5/1999 | Ferri | ......... 181/249 |
| 6,134,885 A | | 10/2000 | Gilbertson | |
| 6,164,412 A | | 12/2000 | Allman | |
| 6,220,387 B1 | * | 4/2001 | Hoppes et al. | ......... 181/259 |
| 6,381,956 B1 | * | 5/2002 | Gilbertson | ......... 60/312 |
| 6,510,921 B2 | * | 1/2003 | Price | ......... 181/264 |
| 6,550,573 B2 | * | 4/2003 | Wagner et al. | ......... 181/255 |

FOREIGN PATENT DOCUMENTS

JP 406081627 * 3/1994 ................. 181/280

* cited by examiner

*Primary Examiner*—Binh Q. Tran

(57) ABSTRACT

The invention is an adjustable exhaust system and an adjustable insert for an exhaust system. The exhaust system includes a header flange, at least one conduit coupled to the header flange, a collector coupled to the conduit, and an adjustable insert for tuning engine performance.

18 Claims, 4 Drawing Sheets

ADJUSTABLE EXHAUST SYSTEM FOR INTERNAL COMBUSTION ENGINE

CROSS-REFERENCE TO RELATED APPLICATION(S)

The present application claims priority to U.S. provisional patent application No. 60/319,097, filed Jan. 24, 2002, which is incorporated herein by reference.

BACKGROUND OF THE INVENTION

1. Technical Field

The present invention relates to an improved internal combustion engine exhaust system. More specifically, it relates to an adjustable insert for an exhaust system.

2. Background

The performance and efficiency of internal combustion engines depends on the efficient movement of gases through the engine, from the introduction of air and fuel through the intake ports into the cylinders of the engine to exhaust of the combustion by-products through the exhaust ports. The exhaust system performs a critical role in this process and has a significant impact on efficiency of the engine. The exhaust system operates to provide complete and efficient "scavenging" of the exhaust gases from the cylinder, in part by providing for low pressure downstream from the cylinders (e.g., back pressure). Effective scavenging of the cylinders results in the use of less power to "pump" exhaust gases out of the cylinder. One method known in the art for facilitating scavenging of the cylinders is to reduce back pressure by reducing the pressure drop through the exhaust system.

A typical exhaust system known in the art includes a header flange, conduits, and a collector. Both the conduits and the collector are round in lateral cross-section. The header flange includes an appropriate number of openings for coupling to the engine exhaust ports. For example, for a four-cylinder engine, the header flange includes four openings for coupling to the exhaust ports of the engine. The system includes four conduits, one corresponding to each opening on the header flange. The collector in one embodiment includes a megaphone or tapered section for reflecting pulses from the engine back toward the exhaust ports.

In a prior art device having conduits and collectors having a round lateral cross-section, the mechanics of fluid flow through a circular tube mandate that the exhaust gases will swirl or move in a spiral fashion as they traverse the exhaust system. The swirl motion results because the volume of the exhaust gases exceeds the volume of the circular tube. This swirl motion increases the residence time of the exhaust gases and the contact with the walls of the exhaust system, which results in a greater pressure drop through the system. This greater pressure drop results in less than optimal engine performance.

In a typical prior art exhaust system, the conduits and collectors have a fixed, non-adjustable length. For example, a typical exhaust system for a four-cylinder engine has four conduits of non-adjustable length, possibly including fixed-length tapered sections. The fixed length systems cannot be adjusted to achieve optimal levels of engine performance.

There is a need in the art for an exhaust system having improved scavenging capabilities and reduced backpressure that results in increased engine performance. There is a further need for a device adapted to have an adjustable length to allow for optimal engine performance levels.

BRIEF SUMMARY OF THE INVENTION

The present invention, in one embodiment, is an adjustable insert for an exhaust system. The adjustable insert has a funnel section sized to fit snugly within an exhaust and a straight section coup led to the funnel section.

In another embodiment, the present invention is an exhaust system for an internal combustion engine. The exhaust system has an exhaust header flange for coupling to an engine, a conduit coupled to the header flange, a collector coupled to the conduit and having an attachment member, and an adjustable insert removeably coupled to the attachment member.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
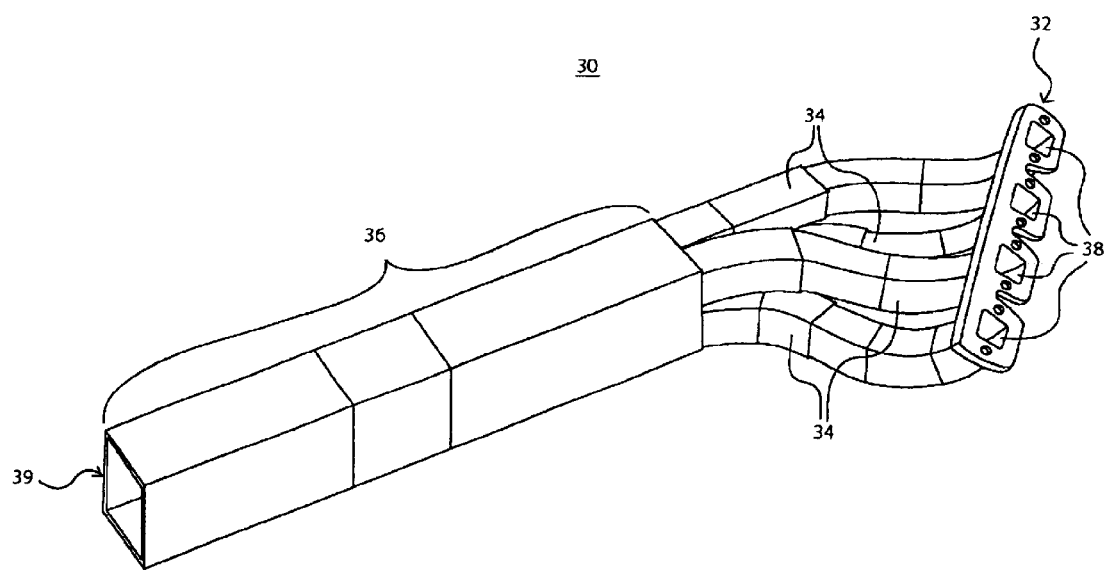
FIG. 1 is a perspective view of an exhaust system having a square cross-section, according to one embodiment of the present invention.

FIG. 1 shows a perspective view of an exhaust system 30 according to one embodiment of the present invention. As shown in FIG. 1, the exhaust system 30 includes a header flange 32, conduits 34, and a collector 36. The header flange 32 is formed according to the dimensions of the engine to which it is intended to attach. In the embodiment shown in FIG. 1, the header flange 32 includes four openings 38 which are coupled to the exhaust ports of the engine. The header flange 32, in one embodiment, is coupled to the engine using a mechanical fastener, such as a set of bolts. The conduits 34 extend from the header flange 32 to the collector 36. As is shown, the conduits 34 have a generally square cross-section. In this embodiment, each of the conduits 34 is of a different length. The conduits 34 have generally thin walls and define a square passageway for flow of the exhaust gases. As shown in FIG. 1, the conduits 34 couple to the collector 36. At this point, exhaust gases flowing through the four separate conduits 34 all enter one common flow path defined by the collector 36. As shown in this embodiment, the collector 36 has a generally square cross-section and defines a generally square flow passageway for the exhaust gases. As further shown in FIG. 1, the collector 36 has a generally thin outer wall 39.

In other embodiments of the present invention, the lateral cross-sections of the conduits 34 and the collector 36 are shaped generally as any parallelogram. A parallelogram is a four-sided plane figure with opposite sides parallel. For example, in one embodiment of the present invention, the conduits 34 and the collector 36 are rectangular in cross-section. In other embodiments, the lateral cross-section of the conduits 34 and the collector 36 is any non-circular shape. For example, in one embodiment the lateral cross-section consists of an arc, with ends connected by a line segment (e.g., a half circle). In another embodiment, the lateral cross-section is triangular. In one embodiment, the lateral cross-section is pie-shaped. In one embodiment, the lateral cross-section is an arc, with the ends connected by a second arc of a larger radius of curvature (e.g., a partial moon segment).

In one embodiment, the collector 36 includes a tapered or megaphone section for reflecting exhaust pulses from the engine back to the exhaust port as expansion waves. The various components of the exhaust system 30 are constructed from any materials known in the art as suitable for an internal combustion engine exhaust system. For example, in one embodiment, each of the header flange 32, the conduits 34, and the collector 36 are constructed from stainless steel. In another embodiment, the header flange 32 is constructed from a different material, such as cast iron. Likewise, the exhaust system 30 is constructed using techniques known in the art. For example, in one embodiment, the components are constructed by welding pieces of metal at right angles, and in another embodiment the components are constructed using a metal bending technique, and connected to one another by welding.

Figure 2:
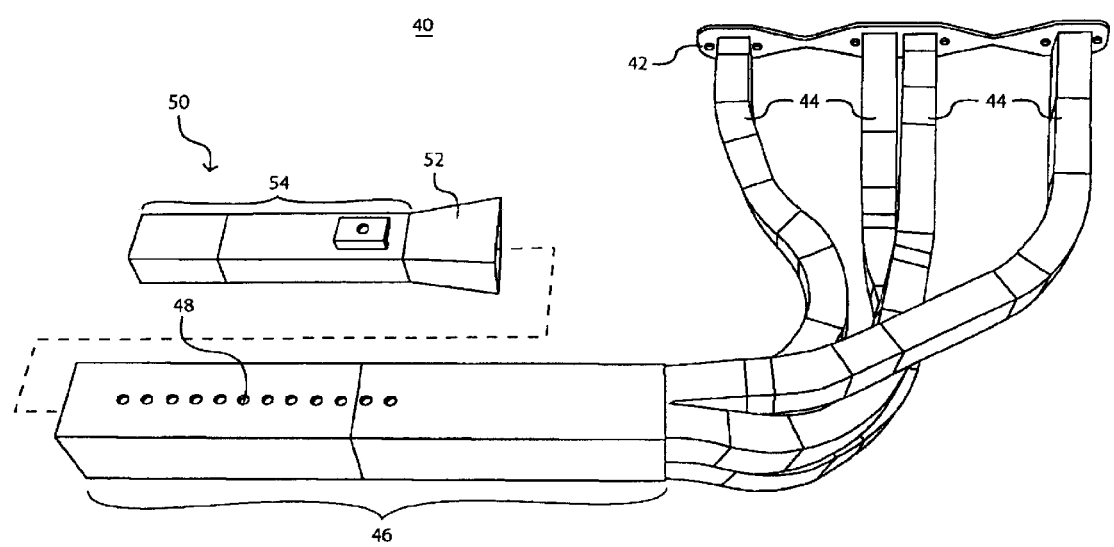
FIG. 2 is a perspective view of an exhaust system having conduits with square cross-sections and generally equal lengths, according to one embodiment of the present invention.

FIG. 2 is a perspective view of an exhaust system 40 according to a second embodiment of the present invention. As shown in FIG. 2, the exhaust system 40 includes a header flange 42, conduits 44, and a collector 46. In this embodiment, the conduits 44 are configured such that they each have approximately the same length extending from the header flange 42 to the collector 46. Like the embodiment shown in FIG. 1, in the embodiment of FIG. 2 the conduits 44 and the collector 46 have a cross-section consisting of a generally parallelogram-shaped external wall defining a generally parallelogram-shaped exhaust gas flow path.

In one embodiment, the cross-section of the conduits 44 and the collector 46 is generally square shaped. In another embodiment, the cross-sections are generally rectangular shaped. In one embodiment of the present invention, the conduits 44 are generally square shaped while the collector 46 is generally rectangular. In another embodiment, the conduits 44 are generally rectangular in cross-section while the collector 46 is generally square in cross-section.

In the embodiment shown in FIG. 2, the collector 46 includes a set of openings 48 which extend through the thin exterior wall of the collector 46. The openings 48 are located on opposing faces of the collector 46. In this embodiment, the openings 48 are used to fasten a tapered insert 50 to the interior of the collector 46. That is, upon insertion of the tapered insert 50 to a desired location inside the collector 46, a threaded hole 56 located on the tapered insert 50 is aligned with one of the openings 48 on the collector 46, and a bolt is inserted through the opening 48 and the threaded hole 56. Alternatively, the tapered insert 50 has a bolt (not shown) that is inserted into the desired opening 48 in the collector 46. The tapered insert 50 includes a funnel section 52 and a straight section 54. The straight section 54 has a generally parallelogram-shaped cross-section that is smaller than the collector 46. As a result, the straight section 54 has a passageway of smaller cross-sectional area than the passageway defined by the collector 46. The funnel section 52 of the tapered insert 50 is inserted into the open end of the collector 46 to effect performance of the engine. Moving the tapered insert 50 further into the collector 46 reduces the effective length of the collector 46 and causes the engine to generate more torque and less horsepower. Moving the tapered insert 50 toward the distal end of the collector 46 increases the effective length of the collector 46 and causes the engine to generate more horsepower and less torque.

In another embodiment, the header flange 42, conduits 44, collector 46, the funnel section 52, and the straight section 54 of the tapered insert 50 have a circular-shaped cross-section. Like the embodiment shown in FIG. 2, the straight section 54 of this embodiment has a passageway of smaller volume than the passageway defined by the collector 46. Similarly, moving the tapered insert 50 further into the collector 46 reduces the effective length of the collector 46 and causes the engine to generate more torque and less horsepower. Moving the tapered insert 50 toward the distal end of the collector 46 increases the effective length of the collector 46 and causes the engine to generate more horsepower and less torque.

In another aspect of the present invention, a plurality of spaced holes (not shown) are made through one or more of the walls of the straight section 54 of the tapered insert 50. The spaced holes interact with the air flow and cause a muffling of the sound generated by the air flow. The muffling effect depends on the number, the size, and the placement of the holes.

The tapered insert 50, in another embodiment, is permanently coupled with the collector 46 after the tapered insert 50 has been adjusted to the appropriate location in the collector 46 to achieve the desired amounts of torque and horsepower. The permanent coupling in one embodiment is achieved by welding the tapered insert 50 to the collector 46. In other embodiments, other methods of permanent fixation known in the art are used.

Figure 3:
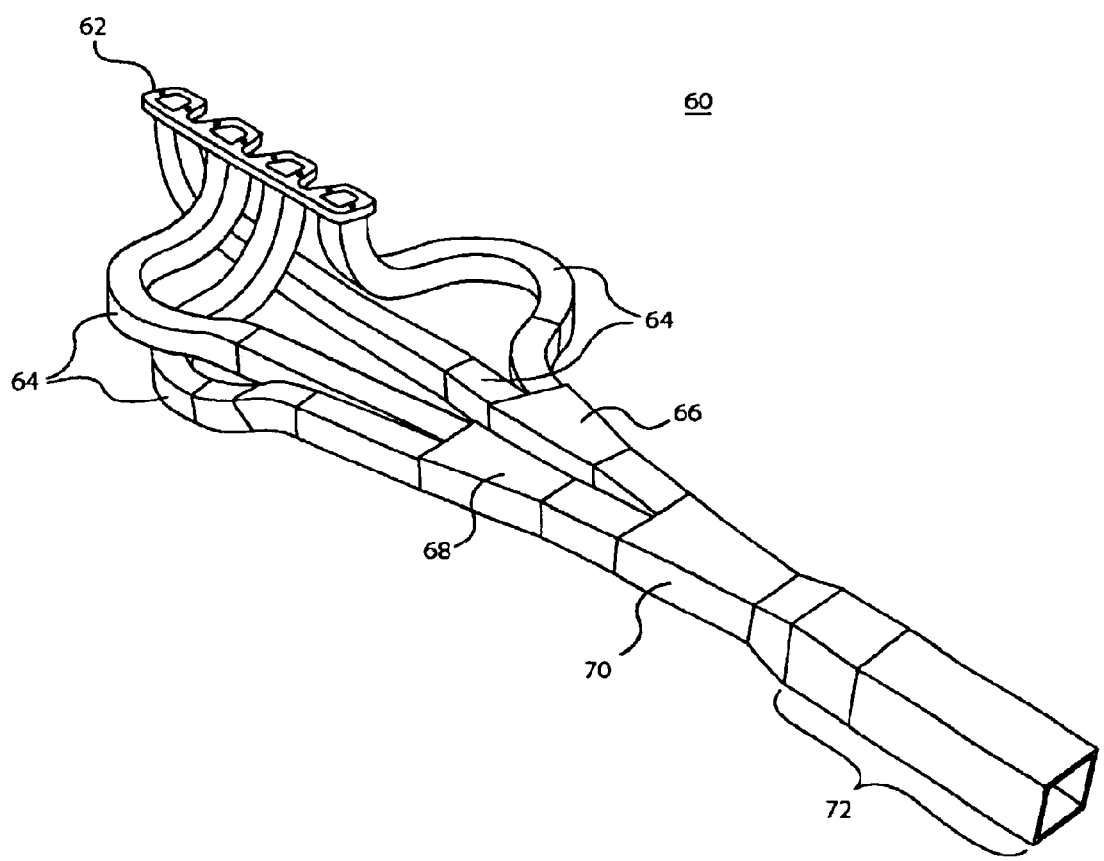
FIG. 3 is a perspective view of a "Tri-Y" square exhaust system, according to one embodiment of the present invention.

FIG. 3 shows a perspective view of a "Tri-Y" exhaust system 60 according to one embodiment of the present invention. As shown in FIG. 3, the exhaust system 60 includes a header flange 62, a set of conduits 64, three Y-connectors 66, 68, 70 and a collector 72. In this embodiment, each of the exhaust gas conducting components is constructed having a generally parallelogram shaped cross-section. In the embodiment shown, each of the conduits 64 is of approximately equal length. The three Y-connectors 66, 68, 70 operate to funnel the flow from the conduits 64 down to a single flow path through the collector 72 using a two step process. The flow from each conduit 64 first combines with the flow from one other conduit 64 at the coupling of the conduits 64 to the first set of Y-connectors 66, 68. The flow then combines a second time at the Y-connector 70 coupled to the collector 72. This funneling results in improved flow rate through the exhaust system, which reduces back pressure and improves engine horsepower.

In one embodiment of the present invention, a plurality of spaced holes (not shown) are made through one or more of the walls of the collector 72. Like the holes in the straight section 54 of the insert 54, the holes in the collector 72 create a sound muffling effect that depends on the number, the size, and the placement of the holes.

Figure 4:
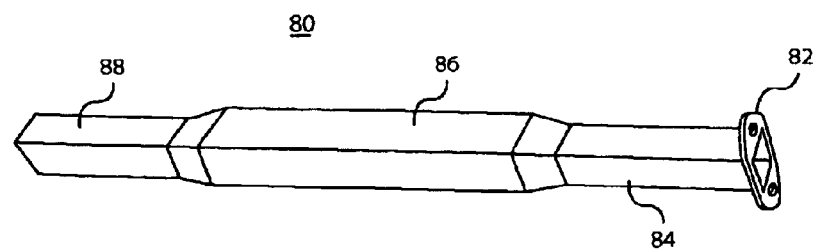
FIG. 4 is a perspective view of a single-cylinder exhaust system having a square cross-section and an expansion chamber, according to one embodiment of the present invention.

FIG. 4 is a perspective view of a single-cylinder exhaust system 80 according to another embodiment of the present invention. As shown in FIG. 4, the exhaust system, 80 includes a header flange 82, a conduit 84, an expansion chamber 86, and a collector 88. Like the embodiment shown in FIG. 1, in the embodiment of FIG. 4 the conduit 84 and the collector 88 have a cross-section consisting of a generally parallelogram-shaped external wall defining a generally parallelogram-shaped exhaust gas flow path. The expansion chamber 86 has a similarly-shaped cross-section. The expansion chamber 86 has a larger cross-section than the conduit 84 or the collector 88. As a result, the expansion chamber 86 defines a passageway of larger cross-sectional area than the passageways defined by the conduit 84 or the collector 88.

In another embodiment, the exhaust system 80 includes a header flange 82, a conduit 84, and a collector 88, but no expansion chamber. Like the embodiment shown in FIG. 4, the conduit 84 and the collector 88 have a cross-section consisting of a generally parallelogram-shaped external wall defining a generally parallelogram-shaped exhaust gas flow path.

Figure 5:
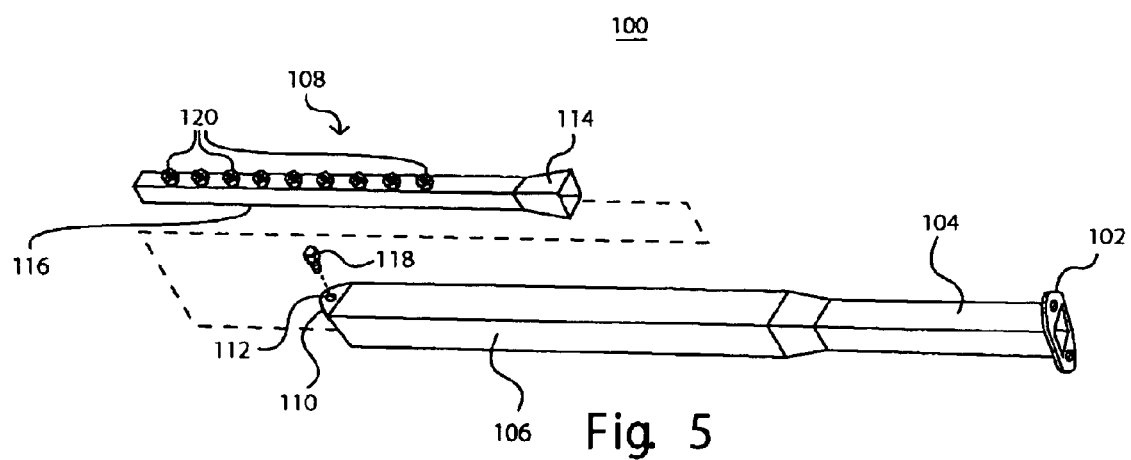
FIG. 5 is a perspective view of a single-cylinder exhaust system having a square cross-section and a tapered insert, according to one embodiment of the present invention.

FIG. 5 shows a perspective view of a single-cylinder exhaust system 100 according to another embodiment of the present invention. As shown in FIG. 5, the exhaust system 100 includes a header flange 102, a conduit 104, an expansion chamber 106, and a tapered insert 108. Like the embodiment shown in FIG. 4, in the embodiment of FIG. 5 the conduit 104 and the expansion chamber 106 have a cross-section consisting of a generally parallelogram-shaped external wall defining a generally parallelogram-shaped exhaust gas flow path. The expansion chamber 106 has a larger cross-section than the conduit 104. As a result, the expansion chamber 106 defines a passageway of larger volume than the passageway defined by the conduit 104.

In the embodiment of FIG. 5, a tongue 10 containing an opening 112 projects from the distal end of the expansion chamber 106. The opening 112 is used in this embodiment to fasten the tapered insert 108 to the interior of the expansion chamber 106. Like the embodiment in FIG. 2, the tapered insert 108 in FIG. 5 includes a funnel section 114 and a straight section 116. In this embodiment, a threaded bolt 118 can be threaded through the opening 112 in the tongue 10 and into one of several openings 120 in or attached to one side of the straight section 116 of the tapered insert 108 to secure the tapered insert 108 in the desired position. The straight section 1.16 has a generally parallelogram-shaped cross-section that is smaller than the expansion chamber 106. As a result, the straight section 116 has a passageway of smaller cross-sectional area than the passageway defined by the expansion chamber 84.

Like the embodiment depicted in FIG. 2, the funnel section 114 of the tapered insert 108 is inserted into the open end of the expansion chamber 106 to influence performance of the engine. Moving the tapered insert 108 further into the expansion chamber 106 reduces the effective length of the expansion chamber 106 and causes the engine to generate more torque and less horsepower. Moving the tapered insert 108 toward the distal end of the expansion chamber 106 increases the effective length of the expansion chamber 106 and causes the engine to generate more horsepower and less torque.

In another embodiment, the header flange 102, conduit 104, expansion chamber 106, and the straight section 116 of the tapered insert 108 have a circular-shaped cross-section. Like the embodiment shown in FIG. 2, the straight section 116 of this embodiment has a passageway of smaller volume than the passageway defined by the expansion chamber 106. Similarly, moving the tapered insert 108 further into the expansion chamber 106 reduces the effective length of the expansion chamber 106 and causes the engine to generate more torque and less horsepower. Moving the tapered insert 108 toward the distal end of the expansion chamber 106 increases the effective length of the expansion chamber 106 and causes the engine to generate more horsepower and less torque.

The tapered insert 108 in another embodiment is permanently coupled with the expansion chamber 106 after the tapered insert 108 has been adjusted to the appropriate location in the expansion chamber 106 to achieve the desired amounts of torque and horsepower.

Exhaust gases, like any fluid traveling through a pipe, naturally tend to move in a spiral or swirling fashion. The embodiments of the present invention having a parallelogram-shaped cross-section, however, prevent propagation of the swirling motion by causing the air to collide with the walls, which are set at angles to one another. Removal of the swirling motion of the exhaust gases allows the exhaust gases to travel more quickly through the conduits and the collector and out to the atmosphere. This more efficient motion results in a lower pressure drop through the exhaust system, which enhances power output of the engine.

In one embodiment of the present invention, the exhaust gas systems are used in combination with an insert (shown in FIGS. 2 and 5). The insert can act to tune the power and torque generated by the engine. As shown in FIG. 2, the larger end of the insert 50 is placed into the distal end of the collector 46. The insert 50 is then mechanically coupled to the collector 46, by for example using bolts passing through openings 48. As depicted in FIG. 5, the larger end of the tapered insert 108 is placed into the distal end of the expansion chamber 106. The tapered insert 108 is then mechanically coupled to the expansion chamber 106. The power and torque are tuned by varying the effective length of the collector 46 in the embodiment of FIG. 2 or the expansion chamber 106 in the embodiment of FIG. 5. Placing the insert 50, 108 the entire distance into the collector 46 or expansion chamber 106 minimizes the effective length of the collector 46 or expansion chamber 106 and thus maximizes the torque output, but results in lower maximum horsepower. On the other hand, placing the insert 50, 108 only slightly into the collector 46 or expansion chamber 106 maximizes the effective length of the collector 46 or expansion chamber 106 and thus maximizes the horsepower, but results in a lower torque output. In other words, the insert 50, 108 allows the performance characteristics of the engine to be varied to match driving conditions.

A device constructed according to the teachings of the present invention was tested and exhibited a significant improvement over prior art exhaust systems. In one test, a "Tri-Y" exhaust system (such as that shown in FIG. 1) with a circular cross-section was used as the prior art device. A 2300 cc four-cylinder engine with a restriction plate was used to test both the prior art device and the device of the present invention, and measurement of torque and horsepower were recorded. The Tri-Y circular device achieved a maximum torque of 141.4 lb-ft (at 4700 rpm) and a maximum power of 157.7 horsepower (at 6300 rpm). Next, a "Tri-Y" square exhaust system, as shown in FIG. 3, was tested. The "Tri-Y" square exhaust system of the present invention achieved a maximum torque of 146.7 lb-ft (at 4200 rpm) and a maximum power of 166.4 horsepower (at 6300 rpm). In other words, a device constructed according to the present invention exhibited a 3.7 percent improvement in torque and a 13 percent improvement in power.

In another test, a square, single-cylinder exhaust system with a tapered insert, as shown in FIG. 5, was tested. A single-cylinder exhaust system with a circular cross-section was used as the prior art device. The engine used to test both the prior art device and the device of the present invention was an unrestricted 2300 cc single-cylinder Briggs and Stratton.

First, an embodiment of the present invention was tested with the tapered insert affixed to the collector at the fifth hole from the distal end of the insert. At 3200 rpm, the prior art device achieved a torque of 9.88 lb-ft and 6.00horsepower.

The square exhaust system at 3200 rpm achieved a torque of 11.05 lb-ft (an improvement of 12%) and 6.72 horsepower (also an improvement of 12%). At 5000 rpm, the prior art device achieved a torque of 9.98 lb-ft and 9.48 horsepower. The embodiment of the present invention with the tapered insert set at the fifth hole from the distal end of the insert at 5000 rpm achieved a torque of 10.63 lb-ft and 10.10 horsepower (improvements of 7% in both cases). At 6800 rpm, the prior art device achieved a torque of 4.08 lb-ft, while the inventive device achieved a torque of 6.59 lb-ft (an improvement of 62%). The prior art device at 6800 rpm achieved 5.28 horsepower, while the device of the present invention achieved 8.32 horsepower (an improvement of 58%).

Second, an embodiment of the present invention was tested with the tapered insert permanently affixed to the collector at the third hole from the distal end of the insert. At 3200 rpm, the square exhaust system achieved a torque of 11.25 lb-ft and 6.84 horsepower. Given the same results as above for the prior art device, this was an improvement of 14% in torque and 14% in horsepower. At 5000 rpm, the embodiment of the present invention achieved a torque of 10.49 lb-ft and 9.98 horsepower (an improvement in both cases of 5%). At 6800 rpm, the present inventive device achieved a torque of 6.5 lb-ft and 8.4 horsepower (both being an improvement of 59%).

Third, an embodiment of the present invention was tested with the tapered insert permanently affixed to the collector at the fourth hole from the distal end of the insert with 1 inch removed from the length of the straight section. At 3200 rpm, this inventive device achieved a torque of 11.08 lb-ft and 6.74 horsepower (improvements of 12% for each measure). At 5000 rpm, the embodiment of the present invention achieved a torque of 10.34 lb-ft and 9.82 horsepower (an improvement of 4% in both cases). At 6800 rpm, the present inventive device achieved a torque of 6.34 lb-ft and 8.2 horsepower (both improvements of 55%).

Although the present invention has been described with reference to preferred embodiments, persons skilled in the art will recognize that changes may be made in form and detail without departing from the spirit and scope of the invention.

What is claimed is:

1. An exhaust system for an internal combustion engine, the exhaust system comprising:
   an exhaust header flange for coupling to an engine;
   a conduit coupled to the header flange;
   a collector coupled to the conduit wherein the collector has an attachment member; and
   an adjustable insert disposed within and removeably coupled to the attachment member of the collector, the adjustable insert having a straight section configured to have a non-circular lateral cross-section along an entire length of the straight section.

2. The exhaust system of claim 1 wherein the adjustable insert is permanently coupleable to the collector.

3. An exhaust system for an internal combustion engine, the exhaust system comprising:
   an exhaust header flange for coupling to an engine;
   a conduit coupled to the header flange;
   a collector coupled to the conduit wherein the collector has an attachment member; and
   an adjustable insert disposed within and removeably coupled to the attachment member of the collector, wherein the conduit, the collector, and the adjustable insert have a non-circular lateral cross-section.

4. The exhaust system of claim 3 wherein the conduit, the collector, and the adjustable insert have a parallelogram-shaped lateral cross-section.

5. The exhaust system of claim 1 wherein the attachment member is a plurality of openings in a wall of the collector.

6. The exhaust system of claim 1 wherein the adjustable insert further comprises:
   a funnel section sized to fit within the, collector funnel section coupled to the straight section.

7. The exhaust system of claim 6 wherein the straight section has a lateral cross-section smaller than a lateral cross-section of the funnel section.

8. The exhaust system of claim 6 wherein the straight section has a lateral cross-section smaller than a lateral cross-section of the collector.

9. The exhaust system of claim 1 wherein the straight section has a parallelogram-shaped lateral cross-section.

10. The exhaust system of claim 6 wherein the straight section has a coupling member, the coupling member being removably coupleable with the attachment member.

11. The exhaust system of claim 10 wherein the coupling member comprises at least one opening defined by a wall of the straight section.

12. The exhaust system of claim 6 wherein the adjustable insert includes a plurality of holes on one or more surfaces of the straight section.

13. A method for adjusting the performance of an internal combustion engine, the method comprising:
   providing an exhaust system for the internal combustion engine, the exhaust system having a distal end;
   inserting an adjustable insert, having a funnel section sized to fit within the distal end of the exhaust system and a straight section disposed distal to the funnel section, longitudinally into the distal end of the exhaust system, the straight section having a non-circular lateral cross-section along an entire length of the straight section; and
   coupling the adjustable insert to the exhaust system;
   wherein the position of the adjustable insert within the distal end of the exhaust system controls the power and torque output from the internal combustion engine.

14. The method of claim 13 wherein the adjustable insert is releasably coupled to the exhaust system.

15. The method of claim 13 wherein the adjustable insert is permanently coupled to the exhaust system.

16. The method of claim 13 further comprising moving the insert toward the distal end of the exhaust system to increase the power output from the internal combustion engine.

17. The method of claim 13 further comprising moving the insert toward a proximal end of the exhaust system to increase the torque output from the internal combustion engine.

18. An exhaust system for an internal combustion engine, the exhaust system comprising:
   an exhaust header flange for coupling to an engine;
   a conduit coupled to the header flange;
   a collector coupled to the conduit wherein the collector has an attachment member; and
   an adjustable insert disposed within and removeably coupled to the attachment member of the collector, the adjustable insert comprising a straight section having a non-circular lateral cross-section along an entire length of the straight section.

* * * * *